US008874872B2

(12) United States Patent
Feldman et al.

(10) Patent No.: US 8,874,872 B2
(45) Date of Patent: Oct. 28, 2014

(54) GARBAGE COLLECTION MANAGEMENT IN MEMORIES

(75) Inventors: Timothy R. Feldman, Louisville, CO (US); Jonathan W. Haines, Boulder, CO (US); Wayne H. Vinson, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 474 days.

(21) Appl. No.: 13/011,246

(22) Filed: Jan. 21, 2011

(65) Prior Publication Data

US 2012/0191937 A1 Jul. 26, 2012

(51) Int. Cl.
| | |
|---|---|
| G06F 12/00 | (2006.01) |
| G06F 13/00 | (2006.01) |
| G06F 13/28 | (2006.01) |
| G06F 12/02 | (2006.01) |

(52) U.S. Cl.
CPC ................ *G06F 12/0253* (2013.01)
USPC .... 711/170; 711/154; 711/165; 711/E12.009; 711/E12.011

(58) Field of Classification Search
CPC ............ G06F 12/0246; G06F 12/0253; G06F 2212/7205
USPC .......................... 711/154, 165, 170
See application file for complete search history.

(56) References Cited

U.S. PATENT DOCUMENTS

| | | | |
|---|---|---|---|
| 5,270,979 A | 12/1993 | Harari et al. | |
| 5,369,615 A | 11/1994 | Harari et al. | |
| 6,065,020 A | 5/2000 | Dussud | |
| 6,829,686 B2 | 12/2004 | Mathiske et al. | |
| 7,657,793 B2 | 2/2010 | Avritzer | |
| 7,774,392 B2 | 8/2010 | Lin | |
| 2001/0023472 A1* | 9/2001 | Kubushiro et al. | ........... 711/103 |
| 2002/0107879 A1* | 8/2002 | Arnold et al. | ................. 707/206 |
| 2002/0166022 A1* | 11/2002 | Suzuki | .......................... 711/103 |
| 2004/0177212 A1 | 9/2004 | Chang et al. | |
| 2004/0248612 A1 | 12/2004 | Lee et al. | |
| 2005/0141312 A1 | 6/2005 | Sinclair et al. | |
| 2005/0144357 A1 | 6/2005 | Sinclair | |
| 2006/0117223 A1 | 6/2006 | Avritzer et al. | |
| 2006/0130044 A1 | 6/2006 | Avritzer et al. | |
| 2006/0161724 A1* | 7/2006 | Bennett et al. | ................. 711/103 |
| 2007/0101095 A1 | 5/2007 | Gorobets | |
| 2007/0101096 A1 | 5/2007 | Gorobets | |
| 2007/0174370 A1 | 7/2007 | Detlefs et al. | |

(Continued)

OTHER PUBLICATIONS http://www.elnec.com/sw/an_elnec_nand_flash.pdf, Aug. 2008, p. 6.*

(Continued)

*Primary Examiner* — Kenneth Lo
*Assistant Examiner* — Sydney Li
(74) *Attorney, Agent, or Firm* — Westman, Champlin & Koehler, P.A.

(57) ABSTRACT

The disclosure is related to systems and methods of managing a memory. In a particular embodiment, a memory channel is disclosed that includes multiple memory units, with each memory unit comprising multiple garbage collection units. The memory channel also includes a controller that is communicatively coupled to the multiple memory units. The controller selects a memory unit of the multiple memory units for garbage collection based on a calculated number of memory units, of the multiple memory units, to garbage collect.

17 Claims, 5 Drawing Sheets

(56) References Cited

U.S. PATENT DOCUMENTS

| | | |
|---|---|---|
| 2007/0174579 A1* | 7/2007 | Shin .......................... 711/170 |
| 2008/0056012 A1 | 3/2008 | Erez |
| 2008/0059692 A1 | 3/2008 | Erez |
| 2008/0251885 A1 | 10/2008 | Kobayashi |
| 2008/0281885 A1 | 11/2008 | Dussud |
| 2009/0132761 A1* | 5/2009 | Yim et al. .................... 711/114 |
| 2009/0172258 A1 | 7/2009 | Olbrich et al. |
| 2009/0180325 A1 | 7/2009 | Ito |
| 2009/0287956 A1 | 11/2009 | Flynn et al. |
| 2009/0310408 A1 | 12/2009 | Lee et al. |
| 2010/0153675 A1 | 6/2010 | Kumar |
| 2011/0107050 A1 | 5/2011 | Vengerov |
| 2012/0005405 A1 | 1/2012 | Wu et al. |

OTHER PUBLICATIONS

Office Action from the United States Patent and Trademark Office dated May 21, 2013 for U.S. Appl. No. 13/011,228.

Final Office Action (Final Rejection) for U.S. Appl. No. 13/011,228, filed Jan. 21, 2011, dated Nov. 7, 2013, 18 pages.

Non-Final Office Action (Rejection) for U.S. Appl. No. 13/011,228, filed Jan. 21, 2011, dated Mar. 25, 2014, 23 pages.

Final Rejection for U.S. Appl. No. 13/011,228, dated Jul. 24, 2014, 21 pages.

* cited by examiner

GARBAGE COLLECTION MANAGEMENT IN MEMORIES

CROSS-REFERENCE TO RELATED APPLICATION

Reference is made to co-pending and commonly assigned U.S. patent application Ser. No. 13/011,228, filed Jan. 21, 2011, entitled "JUST IN TIME GARBAGE COLLECTION", the content of which is hereby incorporated by references in its entirety.

BACKGROUND

Data storage/memory devices are one of many components of modern computers. Examples of data storage devices include hard disk drives (HDDs), which are electromechanical devices containing spinning disks and movable read/write heads, solid state drives (SSDs), which use memory chips and contain no moving parts, and hybrid drives, which combine features of HDDs and SSDs in one unit. The disclosure is related to systems and methods of improving memory device performance.

SUMMARY

In a particular embodiment, a memory channel is disclosed that includes multiple memory units, with each memory unit comprising multiple garbage collection units. The memory channel also includes a controller that is communicatively coupled to the multiple memory units. The controller selects a memory unit of the multiple memory units for garbage collection based on a calculated number of memory units, of the multiple memory units, to garbage collect.

In another particular embodiment, a method is disclosed that includes computing a number of memory units, of multiple memory units in a memory channel, to garbage collect. The method also includes selecting a memory unit of the multiple memory units for garbage collection based on the computed number of memory units.

In yet another particular embodiment, a memory is disclosed that includes multiple memory units, with each memory unit comprising multiple garbage collection units. The memory also includes a controller that is communicatively coupled to the multiple memory units. The controller selects a memory unit of the multiple memory units for garbage collection based on a calculated number of memory units, of the multiple memory units, to garbage collect.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

The disclosure is related to systems and methods for balanced memory channel operation. The systems and methods described herein are particularly useful for flash memory systems; however, the systems and methods described herein can be applied to other types of memory systems where balanced memory channel operation is desired.

Solid state drives (SSDs) and other similar storage devices typically employ media with the following properties:

1) The media are block-erased on some block boundary (erased in erasure blocks (EBs))
2) The media are page written where there are multiple pages per erasure block.

Accordingly, SSDs typically have an erasure block as a minimum reuse unit or garbage collection unit and also support random write workloads with granularity smaller than an erasure block size. When dynamic erasure block allocation is employed in SSDs, random write workloads with granularity smaller than the allocation units cause in-use allocation units to be partially invalidated. Further, random write workloads eventually consume all of the available storage in the SSD. At this point or earlier, garbage collection needs to be applied to recover the unused storage space so that resources can be recycled through the dynamic memory system. Garbage collection of an erasure block is typically carried out when the erasure block includes at least some invalid data (for example, an obsolete or old copy of data). Garbage collection usually involves copying any valid data (i.e., non-obsolete data) from the erasure block, which includes at least some invalid data, to another erasure block with available space to write, and then erasing all the data (valid but copied elsewhere, and invalid) from the erasure block that includes at least some invalid data.

A storage device according to an exemplary embodiment of the disclosure implements a policy to determine how aggressively garbage collection is performed. These policies range along a spectrum from aggressive to passive defined as follows:

Aggressive: the storage device attempts to maintain a maximum number of free erasure blocks to facilitate future writing. This means that as soon as an erasure block has invalid data (caused, for example, by a host write that overlaps the data in question and that new data being written to a different location, resulting in obsolete data in the erasure block) that erasure block is garbage collected.

Passive: the storage device attempts to delay garbage collection as long as possible, by waiting until an erasure block is needed for writing, to start garbage collecting. At that point typically the most dead erasure block (for example, the erasure block with the most invalid data) is chosen for garbage collection.

For example, these policies are considered in the context of one "memory channel" within a memory, where a memory channel is defined as including either a single data bus along with multiple memory units that it communicates with, or multiple such bus-device sets that operate together in a paired fashion such that identical commands always go out on all the paired buses. In the context of the disclosure, a memory unit is a component of a memory that has a sustained performance that contributes to a sustained performance of the memory. The memory unit can include one or more chips. Thus, a memory typically has a plurality of memory units with different ones of the plurality of memory units included in a single channel if the memory includes only a single channel or spread across multiple channels within the memory if it is a multi-channel memory. Details regarding implementation of garbage collection policies in a single memory channel are first described below. This is followed by a description of garbage collection in multi-channel memories.

Choosing a position along this garbage collection policy spectrum represents a tradeoff between wear power and other costs of garbage collection, and sustained write performance for the memory channel. As noted above, an aggressive garbage collection policy ensures that there are a maximal number of erasure blocks empty at any given time. This means that the drive can sustain write performance for the longest possible period of time. However, the more aggressive the garbage collection policy, the worse the deadness of the average erasure block picked for garbage collection. This results in maximum wear, power, etc.

The relationship between garbage collection aggressiveness and sustained performance is more complicated. The maximally passive policy has poor sustained performance because the flash channel must alternate between erasing one or more erasure blocks and writing to one or more erasure blocks. The maximally aggressive policy likewise has poor performance because the poor garbage collection picks result in a large amount of garbage collection work relative to the host work being performed. This is represented by graph 100 of FIG. 1, which is a plot of a variation of a sustained write performance along a vertical axis 102 as a function of garbage collection aggressiveness along horizontal axis 104.

Figure 1:
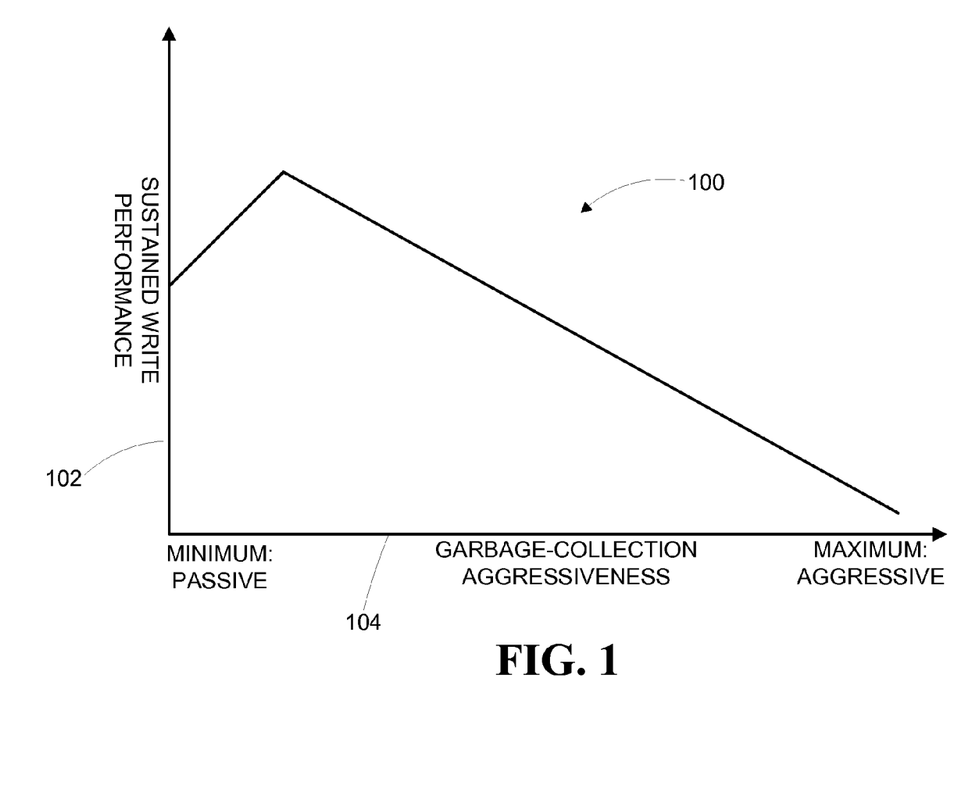
FIG. 1 is a graph of a variation of sustained write performance of a memory channel as a function of garbage collection aggressiveness applied to recover unused storage space from physical storage blocks in the memory channel.

As seen in FIG. 1, a desired garbage collection behavior to maximize sustained write performance is somewhere between the maximally passive and maximally aggressive behavior described above. The following are exemplary embodiments for finding and implementing that substantially maximally performant behavior.

In a particular embodiment, a memory channel is disclosed that includes multiple memory units, with each memory unit comprising multiple garbage collection units. The memory channel also includes a controller that is communicatively coupled to the multiple memory units. The controller selects a memory unit of the multiple memory units for garbage collection based on a calculated number of memory units, of the multiple memory units, to garbage collect. The calculated number of memory units may be a function of a time needed to garbage collect a garbage collection unit of the plurality of garbage collection units.

In another particular embodiment, a method is disclosed that includes computing a number of memory units, of multiple memory units in a memory channel, to garbage collect. The method also includes selecting a memory unit of the multiple memory units for garbage collection based on the computed number of memory units.

In yet another particular embodiment, a memory is disclosed that includes multiple memory units, with each memory unit comprising multiple garbage collection units. The memory also includes a controller that is communicatively coupled to the multiple memory units. The controller selects a memory unit of the multiple memory units for garbage collection based on a calculated number of memory units, of the multiple memory units, to garbage collect.

Figure 2:
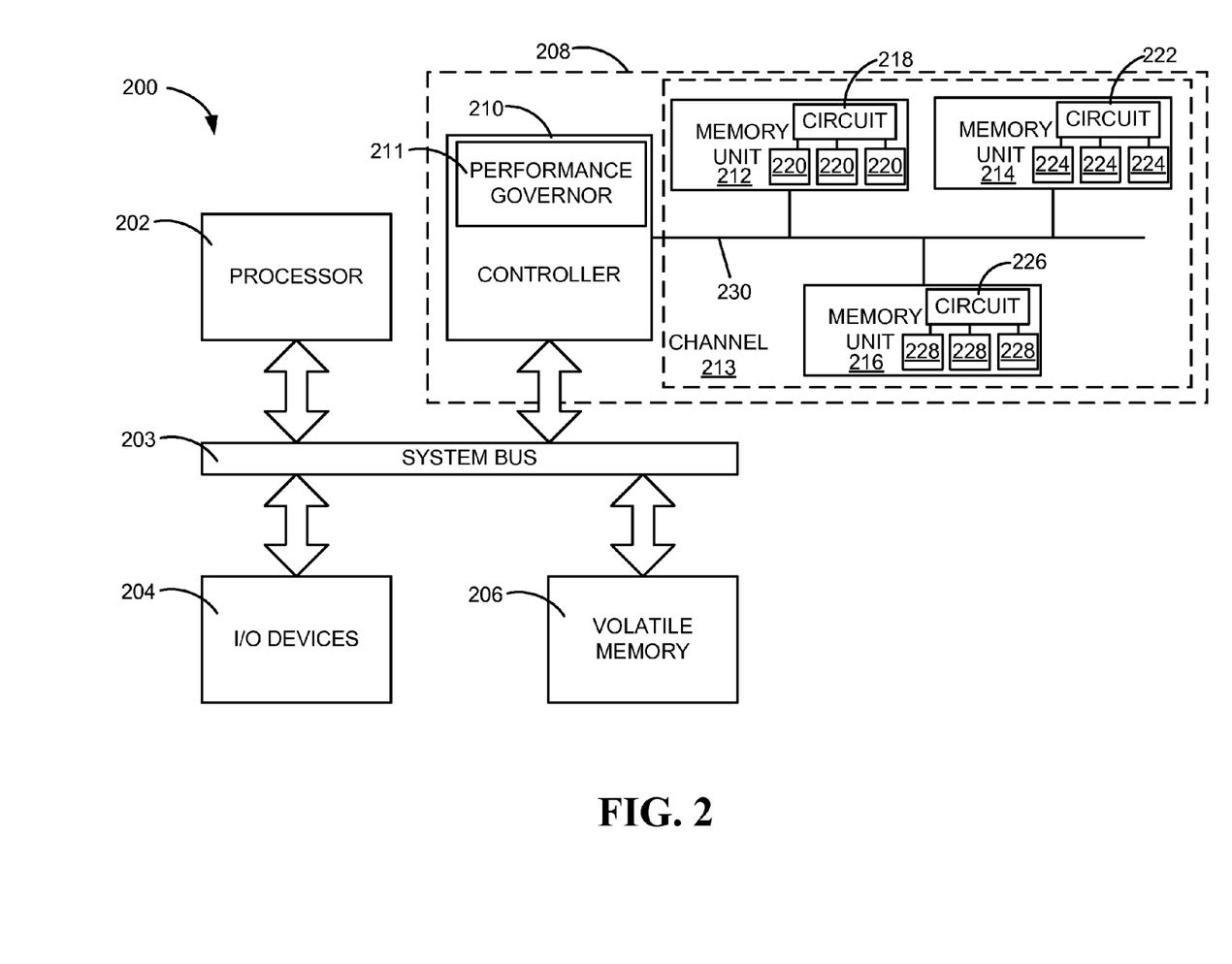
FIG. 2 is a diagram of an illustrative embodiment of a system of memory management.

Referring to FIG. 2, a particular embodiment of a system of memory management is shown and generally designated 200. The system of memory management 200 may include a processor 202 connected to a system bus 203 which also can be connected to input/output (I/O) devices 204, such as a keyboard, monitor, modem, storage device, or pointing device. The system bus 203 may also be coupled to a memory 206, which may be a random access volatile memory, such as dynamic random access memory (DRAM). The system bus may also be coupled to a memory device 208. In a particular embodiment, the memory device 208 comprises a non-volatile flash memory device.

The memory device 208 may include a controller 210, which may be coupled to the processor 202 via a connection through the system bus 203. The controller may include a dynamic memory manager 211 that has allocation and garbage collection responsibilities. Component 211 is described in detail further below. The memory device 208 may also contain multiple memory units such as 212, 214 and 216. Each memory unit may comprise one or more integrated circuit memory chips. Each chip/memory unit 212, 214, 216 may include a memory unit control circuit 218, 222, 226 and a plurality of physical blocks 220, 224, 228 in which data may be stored. Each memory unit control circuit 218, 222, 226 may include erase, write and read circuits for operating the respective physical blocks 220, 224 or 228. At different stages during operation of memory device 208, one or more of physical blocks 220, 224 or 228 may be garbage collected to recover unused storage space. As will be described in detail further below, dynamic memory manager 211 helps ensure that garbage collection behavior within device 208 is such that sustained write performance of device 208 is substantially maximized. In the embodiment shown in FIG. 2, all memory units in memory device 208 may be connected to a single memory bus 230, which also may couple to controller 210. Memory units 212, 214 and 216 and memory bus 230 connected to the memory units 212, 214 and 216 together constitute a memory channel 213. In the embodiment of FIG. 2, controller 210 is shown outside channel 213 and may be connected to additional memory channels (not shown), similar to channel 213, each having a different bus connection to which different memory units are coupled. It should be noted that, in some embodiments, controller 210 may be a part of memory channel 213. In any event, controller 210 may perform intelligent and higher level memory operations and interfacing. Some of these features of controller 210 are described below.

During operation, the processor 202 may send a command and data to the memory device 208 to retrieve or store data. The controller 210 can receive the command and data from the processor 202 and then manage the execution of the command to store or retrieve data from the memory units 212, 214 and 216. As noted above, controller 210 includes a dynamic memory manager 211 that helps ensure that garbage collection behavior within device 208 is such that sustained write performance of device 208 is substantially maximized. In a particular embodiment, dynamic memory manager 211 selects a memory unit 212, 214, 216 of the multiple memory units for physical block erasure based on a calculated number of memory units, of the multiple memory units 212, 214 and 216, to block erase for balanced memory channel operation. Details regarding obtaining the calculated number of memory units of the multiple memory units to block erase for balanced memory operation are provided below along with a description of FIG. 3.

Figure 3:
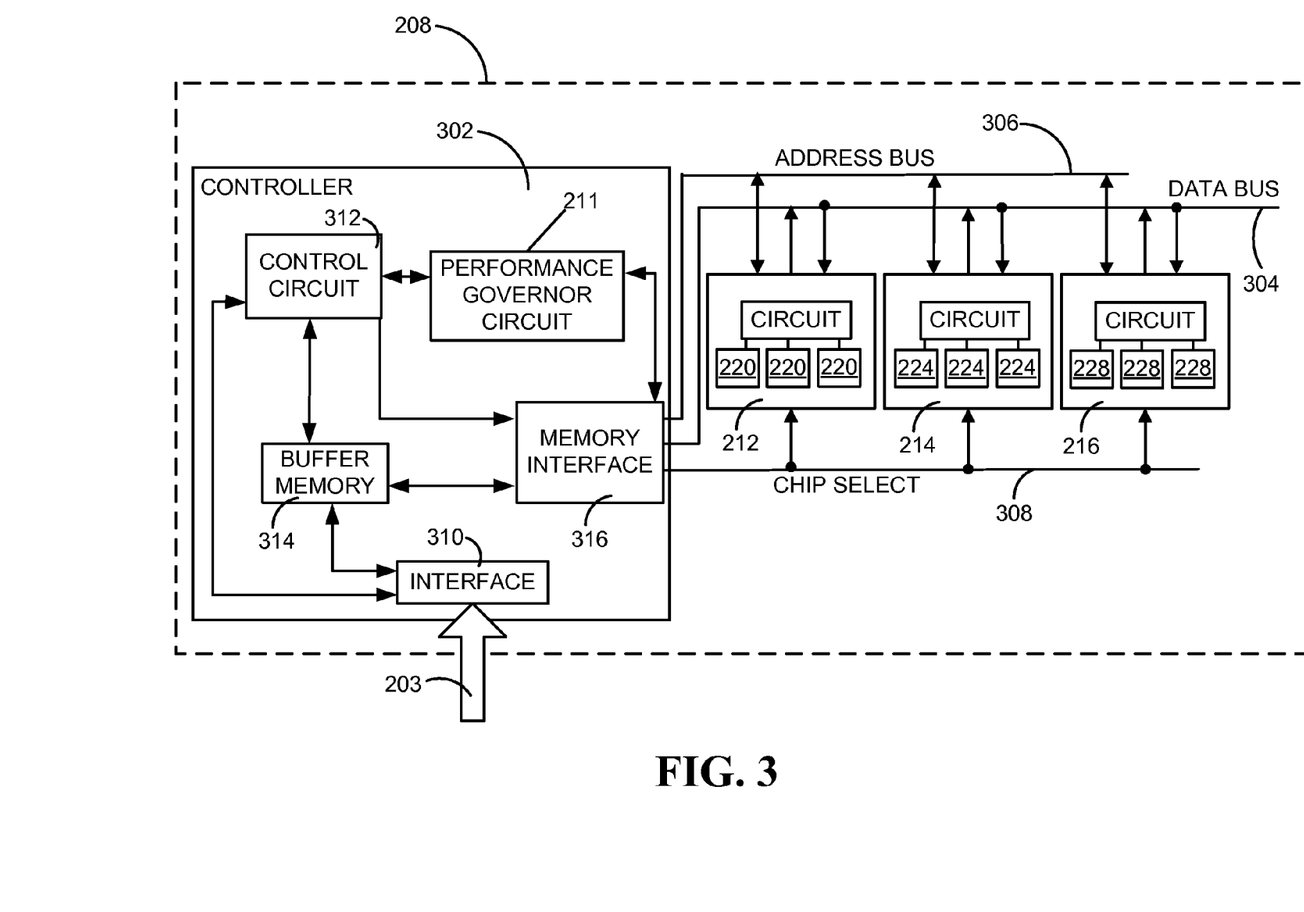
FIGS. 3 and 4 are diagrams of other illustrative embodiments of systems of memory management.

Referring to FIG. 3, a particular embodiment of the memory device 208 is shown. The memory device 208 of FIG. 3 may include a controller 302 coupled to memory units 212, 214 and 216 via a data bus 304, an address bus 306, and a chip select bus 308. Each memory unit 212, 214, 216 may comprise non-volatile flash memory. In another embodiment, more memory units may be coupled to the data bus 304, the address bus 306, and chip select bus 308 than are shown in FIG. 3.

The controller 302 may be coupled to the system bus 203 via a device interface 310 that can receive and send commands and data to a host, such as the processor 202 in FIG. 2. The device interface 310 may pass the command to control circuit 312 for processing and also store the received data in a buffer memory 314. A memory interface 316 can receive data from the buffer memory 314 to be written to one of the memory units 212, 214, or 216 and receive address bits from the control circuit 312. Memory interface 316 may assert corresponding data and address bits with appropriate timing and format to a selected memory unit 212, 214, 216. Memory interface 316 may also read previously stored data from any selected sector of memory units 212, 214 or 216. In general, control circuit 312 operates in conjunction memory interface 316 to execute memory access requests that are received from a host or access operations that are internally carried out in connection with memory maintenance operations, etc.

As can be seen in FIG. 3, dynamic memory manager 211 is included within controller 302. As noted earlier, dynamic memory manager 211 helps ensure that garbage collection behavior within device 208 is such that sustained write performance of device 208 is substantially maximized. Also, as noted above, in a particular embodiment, dynamic memory manager 211 selects a memory unit 212, 214, 216 of the multiple memory units for physical block erasure based on a calculated number of memory units, of the multiple memory units 212, 214 and 216, to block erase for balanced memory channel operation. In one embodiment, the calculated number of memory units, of the multiple memory units 212, 214 and 216, to block erase for balanced memory channel operation is a calculated minimum number of memory units to block erase for balanced memory channel operation.

In one embodiment, dynamic memory manager 211 may be programmed with the calculated number of memory units to block erase for balanced memory channel operation. In a particular embodiment, dynamic memory manager 211 may include an algorithm to compute the number of memory units to block erase for balanced memory channel operation. The number of memory units to block erase for balanced memory channel operation may be a function of one or more parameters of memory units 212, 214 and 216. Some of the parameters may be fixed and others may be variable over the life of device 208. An exemplary set of parameters utilized in one embodiment to compute the number of memory units to block erase in a memory channel are as follows:

N: number of memory units per channel.
P: pages per erasure block.
Q: maximum number of memory units on the bus that can be active at a given time due to power constraints (<=N).
Tprog_bus: bus time required to transfer a page for programming and to send the program command.
Tprog: time required for a memory unit to program a page.
Terase: time required for a memory unit to erase an erasure block.
Tgc_read: time required to perform a read operation required to garbage collect an erasure block in the memory channel selected for garbage collection. This is a run-time parameter unlike the earlier-noted parameters, which are static design-time parameters.

An erasure block is defined as "open" if it has pages which can be written and at least one page which is written. An erasure block is defined as "empty" if it has pages which can be written and no pages which have already been written.

When a memory device such as 208 is newly deployed, it typically starts in a state where each memory unit has at least one open or empty erasure block. The newly deployed memory device starts receiving write commands with data for storage from the host and responsively stores the received data in open erasure blocks in the different memory units until substantially all the open erasure blocks contain stored data, and then allocates an empty erasure block to start filling. The number of empty erasure blocks hits some threshold and the device selects a filled erasure block for garbage collection. At this point, the memory device has just reached a steady state, and will continue to operate in the steady state for the rest of its life span. From the time the memory device is newly deployed to the point at which it first reaches the steady state, no garbage collection is needed. However, after this point, in accordance with some embodiments, during a steady state of the memory device, each memory unit is typically in one of two states:

1. It has either one open or empty erasure block,
2. It has one open and one empty erasure block.

It additionally is typically in one of three states:
1. The memory unit is currently garbage collecting (i.e., the memory unit is reading data for GC, writing data for GC or erasing an erasure block).
2. The memory unit is currently accessing data to satisfy a host command.
3. The memory unit is idle.

In one embodiment, a minimum number of memory units to garbage collect in a memory channel in order maintain balanced steady state operation of the memory channel is computed. A minimum number of memory units to garbage collect is desired to minimize the costs of garbage collection. In a particular embodiment, the following steps are employed to compute that number, X:

Compute a number of memory units in the channel that are active when writing:

$$M = T\text{prog}/T\text{prog\_bus} \qquad \text{Equation 1}$$

Compute a ratio of erasing memory units to writing memory units required for steady state operation:

$$R = (T\text{erase} + T\text{gc\_read})/(T\text{prog} * P) \qquad \text{Equation 2}$$

Using M and R, determine X as follows:

$$X = \text{ROUND\_UP}(R * M) \qquad \text{Equation 3}$$

As noted above, X memory units need to be garbage collecting simultaneously to minimize costs of garbage collection.

In another embodiment, Q is an additional parameter utilized to determine X. This embodiment involves the following:

Compute a maximum number of memory units in the channel that are active when writing:

$$MD = \text{MAX}(Q, T\text{prog}/T\text{prog\_bus}) \qquad \text{Equation 4}$$

Compute a ratio of erasing memory units to writing memory units required for steady state operation:

$$R = (T\text{erase} + T\text{gc\_read})/(T\text{prog} * P) \qquad \text{Equation 5}$$

In an example, if $R*MD <= Q$, then $X = \text{ROUND\_UP}(R*MD)$ memory units need to be garbage collecting simultaneously. In this example, if $R*MD > Q$, then $X = \text{ROUND\_UP}((Q*R)/(1+R))$ memory units must be carrying out garbage collection at one time and the amount of garbage collection work that has to be done is sufficient that it will decrease burst write performance for the channel in favor of maximizing sustained write performance.

When memory units currently garbage collecting are <X, a new garbage collection is started. In some embodiments, computations carried out to obtain X are substantially continuous and therefore values for X are substantially continuously updated. This could lead to a scenario in which a newly calculated value of X is smaller that a previously value of X and the number of units in garbage collection is based on the previously calculated value of X. At this point in time, the number of units in garbage collection becomes >X. One approach to address such a scenario is to temporarily change a rate of progress of the garbage collection.

Figure 4:
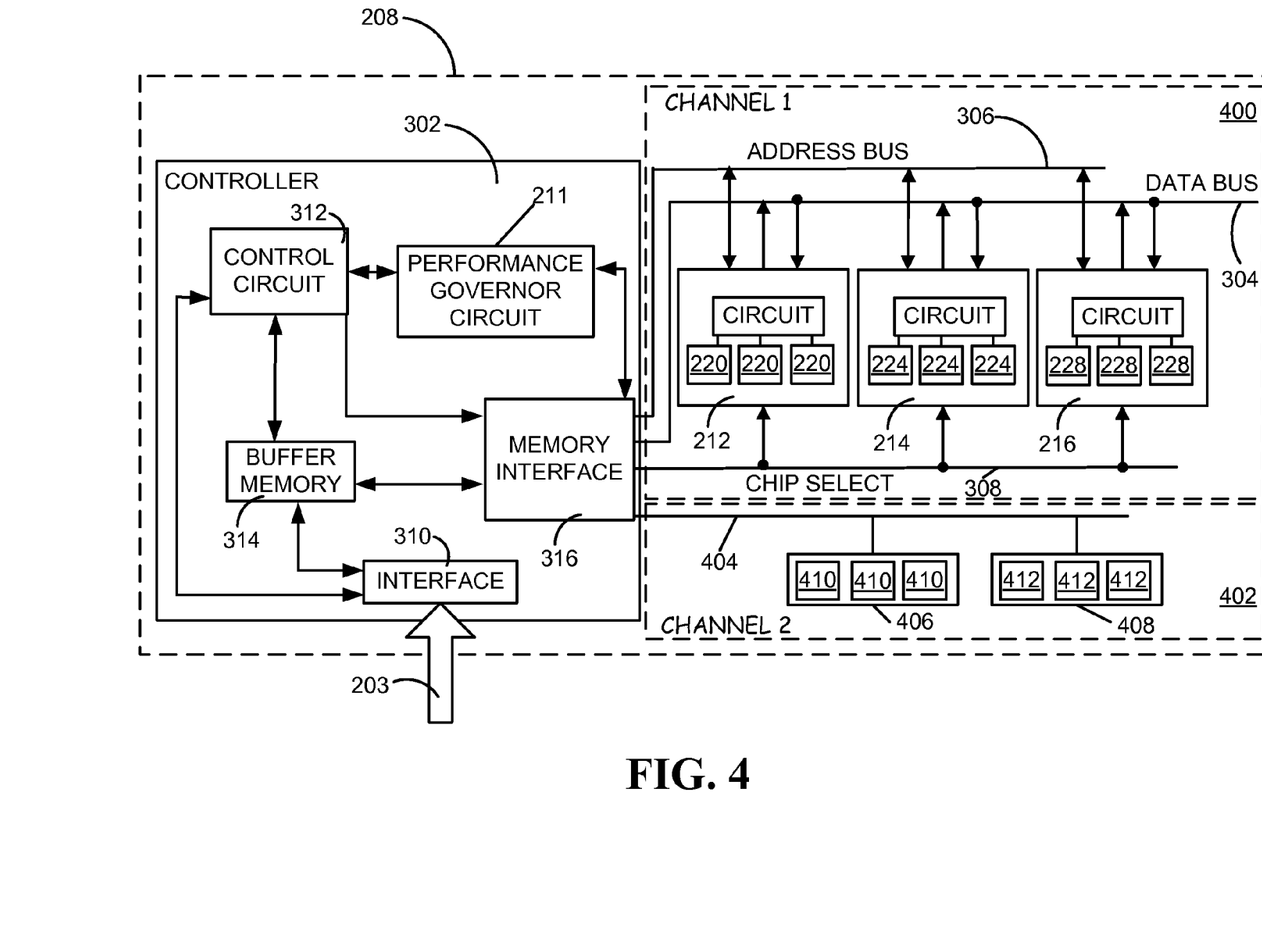

As noted above, in some embodiments, the memory units comprise flash memory units. It should be noted that certain flash memory units include dual-plane and/or quad-plane operation modes. In such modes, the flash memory unit can be programmed and/or erased in "bigger chunks." The "bigger chunks" may be two or more times a size of a minimum addressable storage unit (i.e., an erasure block). The different embodiments described above are applicable to memory channels with memory units that operate in dual-plane, quad-plane, or any other such modes. Thus, it should be noted that, although the above-described embodiments equate a garbage collection unit to a single erasure block, in some embodiments, multiple erasure blocks might constitute a single garbage collection unit. The above-described embodiments primarily deal with garbage collection in a single memory channel. FIG. 4 and the corresponding description below address garbage collection in multi-channel memories.

Referring to FIG. 4, an embodiment of the memory device 208 that includes multiple channels 400 and 402 is shown. Other than including multiple channels, the elements of FIG. 4 are similar to those shown in the memory device of FIG. 3. First channel (channel 1) 400 includes the same elements as those included in the single channel of FIG. 3. Second channel (channel 2) 402 includes two memory units 406 and 408, with each of the memory units including erasure blocks or garbage collection units 410, 412. In the interest of simplification, data bus 304, address bus 306 and chip select bus 308 are only shown in first channel 400, and second channel 402 is shown with only a single communication bus 404. Also, in the interest of simplification, circuitry within memory interface 316 that allows controller 302 to select one of channels 400 and 402 is not shown.

In a particular embodiment, dynamic memory manager 211 may include an algorithm that implements garbage collection policies similar to those described in connection with FIG. 3 separately in each of channels 400 and 402. Specifically, any calculations and decisions regarding selecting garbage collection units in first channel 400 are performed separately and independently of the garbage collection related calculations and decisions regarding second channel 402. This approach is suitable when only the performance of some, but not all channels is important such as with depth-first striping or other schemes that do not fully exploit channel concurrency. In some such embodiments, where garbage collection policies are implemented separately in individual channels, a separate dynamic memory manager for each channel may be utilized instead of a single dynamic memory manager 211.

In another particular embodiment, dynamic memory manager 211 may include an algorithm that implements the garbage collection policy among all channels together. In such an embodiment, from a garbage collection standpoint, first channel 400 and second channel 402 are treated as a single channel by dynamic memory manager 211. The approach is suitable when the write performance of each channel is independently important such as with width-first striping or other schemes that exploit concurrency among the channels.

In one embodiment, control circuit 312 and dynamic memory manager 211 are substantially integrated. In such an embodiment, control circuit 312 and dynamic memory manager 211 are implemented in a common processor and include program code stored on a common computer storage medium. In another embodiment, control circuit 312 and dynamic memory manager 211 are implemented in different processors, with different computer storage media utilized to store program code for the respective circuits. In general, any suitable processor or suitable combination of processors along with one or more computer storage media may be used to implement control circuit 312 and dynamic memory manager 211.

Figure 5:
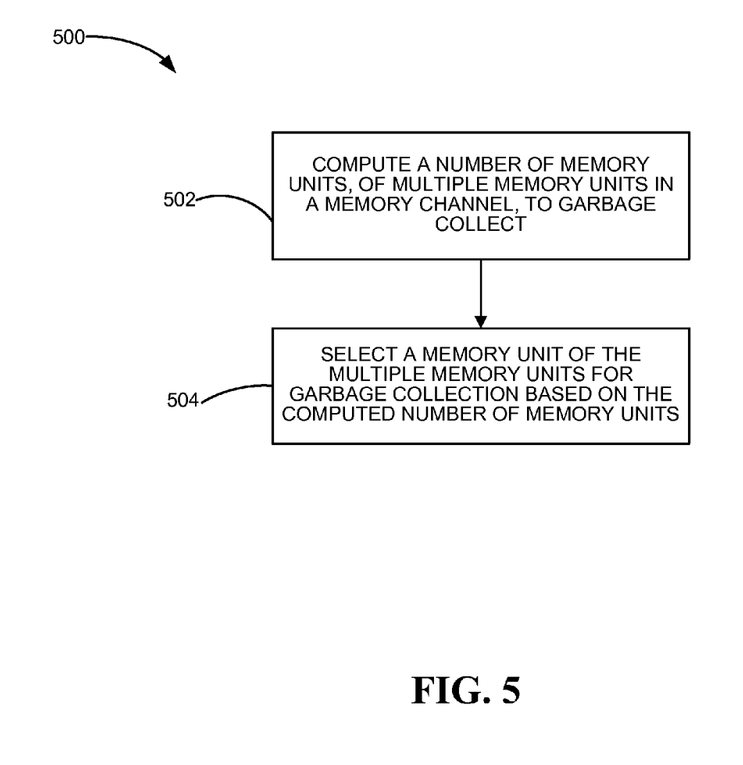
FIG. 5 is a flow diagram of an embodiment of a method of memory management.

Referring to FIG. 5, a very simplified flow diagram of a particular illustrative embodiment of a method of memory management is shown and generally designated 500. The method 500 may be implemented via the dynamic memory manager 211. The method 500 may include computing a number of memory units, of multiple memory units in a memory channel, to garbage collect, at 502. The method may then include selecting a memory unit of the multiple memory units for garbage collection based on the computed number of memory units, at 504.

In accordance with various embodiments, the methods described herein may be implemented as one or more software programs running on a computer processor or controller, such as the controller 210 or the controller 302. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A memory channel comprising:
a plurality of memory units, with each memory unit comprising a plurality of garbage collection units; and
a controller communicatively coupled to the plurality of memory units, the controller configured to select a memory unit of the plurality of memory units for garbage collection based on a calculated number of memory units, of the plurality of memory units, to garbage collect,
wherein the calculated number of memory units, of the plurality of memory units, to garbage collect is dynamically obtained as a function of a time-variable parameter of the plurality of memory units and as a function of a ratio of erasing memory units of the plurality of memory units to writing memory units of the plurality of memory units, and
wherein the ratio of erasing memory units to of the plurality of memory units to writing memory units of the plurality of memory units is:

$$R = (T\text{erase} + T gc\_\text{read})/(T\text{prog} * P)$$

where
Tprog is a time required for a memory unit to program a page,
Terase is a time required for a memory unit to erase an erasure block,
Tgc_read is a time required to perform a read operation required to garbage collect an erasure block in a memory channel selected for garbage collection, wherein Tgc_read is a run-time parameter, and
P is pages per erasure block.

2. The memory channel of claim 1 wherein the calculated number of memory units is a function of a time needed to garbage collect a garbage collection unit of the plurality of garbage collection units.

3. The memory channel of claim 1 wherein the controller is configured to select the memory unit of the plurality of memory units for garbage collection if a number of active memory units of the plurality of memory units is less than a maximum number of memory units of the plurality of memory units in the memory channel that can be active at a given time due to power constraints.

4. The memory channel of claim 1 wherein the calculated number of memory units, of the plurality of memory units, to garbage collect is a calculated minimum number of memory units, of the plurality of memory units, to garbage collect.

5. The memory channel of claim 1 wherein the controller is communicatively coupled to the plurality of memory units via a communication bus and wherein each of the plurality of garbage collection units comprises a plurality of memory pages.

6. The memory channel of claim 5 wherein the calculated number of memory units, of the plurality of memory units, to garbage collect is a function of a time for transferring data having a size equal to a size of a page, of the plurality of pages, from the controller over the communication bus to one of the plurality of memory units.

7. The memory channel of claim 5 wherein the calculated number of memory units, of the plurality of memory units, to garbage collect is a function of a time to send a page program command from the controller over the bus to the memory unit of the plurality of memory units.

8. A memory comprising a plurality of the memory channel according to claim 1 with each of the plurality of memory channels individually utilizing similar criteria to select a memory unit for garbage collection as utilized in the memory channel of claim 1.

9. A method comprising:
dynamically calculating a number of memory units, of a plurality of memory units in a memory channel, to garbage collect as a function of a time-variable parameter of the plurality of memory units and as a function of a ratio of erasing memory units of the plurality of memory units to writing memory units of the plurality of memory units,
wherein the ratio of erasing memory units to of the plurality of memory units to writing memory units of the plurality of memory units is:

$$R = (T\text{erase} + T gc\_\text{read})/(T\text{prog} * P)$$

where
Tprog is a time required for a memory unit to program a page,
Terase is a time required for a memory unit to erase an erasure block,
Tgc_read is a time required to perform a read operation required to garbage collect an erasure block in a memory channel selected for garbage collection, wherein Tgc_read is a run-time parameter, and
P is pages per erasure block; and
selecting a memory unit of the plurality of memory units for garbage collection based on the calculated number of memory units.

10. The method of claim 9 wherein calculating the number of memory units, of the plurality of memory units in the memory channel, to garbage collect is carried out as a function of a time needed to garbage collect a garbage collection unit of the plurality of garbage collection units.

11. The method of claim 9 wherein calculating the number of memory units, of the plurality of memory units in a memory channel, to garbage collect is carried out as a function of a maximum number of memory units of the plurality of memory units in the memory channel that can be active at a given time due to power constraints.

12. The method of claim 9 wherein calculating the number of memory units, of a plurality of memory units in a memory channel, to garbage collect comprises calculating a minimum number of memory units of a plurality of memory units in the memory channel, to garbage collect.

13. The method of claim 9 wherein the calculating and selecting steps are carried out by a controller that is communicatively coupled to the plurality of memory units via a communication bus, and wherein each memory unit comprises a plurality of garbage collection units that each comprise a plurality of memory pages.

14. The method of claim 13 wherein calculating a number of memory units, of a plurality of memory units in a memory channel, to garbage collect is carried out as a function of a time for transferring data having a size equal to a size of a page, of the plurality of pages, from the controller over the communication bus to one of the plurality of memory units.

15. The method of claim 13 wherein calculating a number of memory units, of a plurality of memory units in a memory channel, to garbage collect is carried out as a function of a time to send a page program command from the controller over the bus to the memory unit of the plurality of memory units.

16. A memory comprising:

a plurality of memory units, with each memory unit comprising a plurality of garbage collection units; and a controller communicatively coupled to the plurality of memory units, the controller configured to select a memory unit of the plurality of memory units for garbage collection based on a calculated number of memory units, of the plurality of memory units, to garbage collect, wherein the calculated number of memory units, of the plurality of memory units, to garbage collect is dynamically obtained as a function of a time-variable parameter of the plurality of memory units and as a function of a ratio of erasing memory units of the plurality of memory units to writing memory units of the plurality of memory units, and wherein the ratio of erasing memory units to of the plurality of memory units to writing memory units of the plurality of memory units is:

$$R = (T\text{erase} + T\text{gc\_read})/(T\text{prog}*P)$$

where $T\text{prog}$ is a time required for a memory unit to program a page, $T\text{erase}$ is a time required for a memory unit to erase an erasure block, $T\text{gc\_read}$ is a time required to perform a read operation required to garbage collect an erasure block in a memory channel selected for garbage collection, wherein $T\text{gc\_read}$ is a run-time parameter, and P is pages per erasure block.

17. The memory of claim 16 wherein the plurality of memory units are distributed across a plurality of channels.

* * * * *